(12) United States Patent
Glebov

(10) Patent No.: US 7,724,987 B2
(45) Date of Patent: May 25, 2010

(54) METHOD AND APPARATUS FOR DYNAMIC POLARIZATION CONTROL

(75) Inventor: Alexei Glebov, San Mateo, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/010,789

(22) Filed: Dec. 13, 2004

(65) Prior Publication Data

US 2006/0126989 A1 Jun. 15, 2006

(51) Int. Cl.
*G02B 6/00* (2006.01)
(52) U.S. Cl. .............................. 385/11; 385/13; 385/15; 385/39
(58) Field of Classification Search ................... 385/11, 385/140
See application file for complete search history.

(56) References Cited

U.S. PATENT DOCUMENTS

| 6,724,512 | B2 * | 4/2004 | Carlson et al. | 359/244 |
| 6,763,154 | B2 * | 7/2004 | MacDonald et al. | 385/13 |
| 2004/0223718 | A1 * | 11/2004 | Romo et al. | 385/140 |
| 2005/0196099 | A1 * | 9/2005 | Willcox | 385/18 |

FOREIGN PATENT DOCUMENTS

WO 03/067285 A2 1/2003

OTHER PUBLICATIONS

Office Action, Chinese Patent Application No. 200510134661.4, including English Translation, 8 pgs., Dec. 5, 2008.
Office Action, Chinese Patent Application No. 200510134661.4, including English Translation, 16 pgs., Jun. 5, 2009.

* cited by examiner

*Primary Examiner*—Tina M Wong
(74) *Attorney, Agent, or Firm*—Baker Botts L.L.P.

(57) ABSTRACT

A dynamic polarization controller ("DPC") that and method of dynamic polarization control useful in optical networks is disclosed. The DPC of the present invention has a polymeric optical waveguide formed on a substrate, such as a silicon wafer. An intermediate portion of the waveguide is suspended over a cavity, and a deflecting structure, such as an electrodes, is provided for controllably exerting a force on the suspended portion of the waveguide. Exerting a deflecting force on the suspended portion of the waveguide induces controllable birefringence in the waveguide core and, thereby allows dynamic control over the polarization properties of light passing through the DPC. An array of DPC's of the present invention can be formed on a single substrate and used in an optical network, for example a WDM system whereby plural light signals traveling through a single optical fiber are demultiplexed for processing. A plurality of the DPC may be formed in series on a substrate to increase the degree of polarization control. The DPC's of the present invention may be combined with differential group delay ("DGD") compensators to dynamically compensate for polarization mode dispersion ("PMD") of optical signals. The DPC's of the present invention can operate in millisecond time-frames, thereby providing real time PMD compensation.

22 Claims, 4 Drawing Sheets

METHOD AND APPARATUS FOR DYNAMIC POLARIZATION CONTROL

BACKGROUND OF THE INVENTION

1. Field of the Invention

The present invention is related to optical communications systems and is particularly directed to a method and apparatus for dynamic polarization control that is useful in a system for compensating for polarization mode dispersion in optical fibers.

2. Background

Optical communications systems employing optical networks are critical to meeting the ever-increasing demand for high speed communications systems capable of attaining higher data transfer rates. Such systems generally employ wavelength division multiplexing ("WDM") whereby a plurality of optical signals are simultaneously transmitted as separate channels in a single optical fiber. As higher data rates are implemented, polarization mode dispersion ("PMD") becomes a critical issue, such that PMD is currently regarded as one of the dominant obstacles to increased data transfer rates. It is generally understood that PMD begins to become a factor at data transfer rates of 10 Gb/s and compensation for PMD is critical to avoid data loss at rates exceeding 40 Gb/s.

Unlike chromatic dispersion, PMD is not fixed and changes constantly as a function of many time-variable factors, drifting in time scales that vary from a few milliseconds to several hours. PMD arises due to birefringence in an optical fiber that causes light of different polarization to travel at different speeds. Although, theoretically, a perfectly round optical fiber is not birefringent, such birefringence may be introduced when the fiber is subject to uneven mechanical stress, for example, due to bending, compression, heating, etc. As a result, static compensation of PMD is not practical. Thus, an effective system for compensating for PMD should be dynamic and capable of responding to changes in the polarization properties of the transmitted signals in a matter of a few milliseconds. Moreover, PMD can vary from channel to channel, and so a system for compensating for PMD should be controllable on a channel-by-channel basis. Preferably, apparatus used for PMD compensation should be compatible and readily integrated with other devices in a WDM optical network, such as multiplexers (MUX), demultiplexers (DE-MUX), variable optical attenuators (VOA), planar optical amplifiers, optical switches, etc. Finally, PMD compensation apparatus should be relatively easy and inexpensive to construct. A dynamic polarization controller is a key component of a system to compensate for PMD.

While considerable effort has gone into studying PMD and its causes, it is believed that less effort has been directed to solving the problem, particularly in a way that could be usefully implemented in WDM optical networks on a cost-effective basis. Thus, there is a need for improved apparatus and methods for dynamically compensating for PMD in optical networks, and such is an object of the present invention. Moreover, there is a need for improved polarization controllers for use in PMD compensation system and in other applications.

SUMMARY OF THE INVENTION

The foregoing objects and aspects are achieved in accordance with the present invention which, in one aspect, is directed to a dynamic polarization controller, comprising a substrate, an optical waveguide formed on the substrate, the optical waveguide having an intermediate portion thereof suspended in a cavity over the substrate, and a deflecting structure for controllably exerting a force on the suspended portion of the waveguide, such that the polarization properties of the waveguide can be controllably varied by the deflecting structure. Preferably the substrate is silicon and the waveguide is formed from optical polymers. In the disclosed embodiment, the deflecting structure comprises electrodes; preferably the cavity has sidewalls adjacent to sidewalls of the waveguide, and the cavity sidewalls and waveguide sidewalls have opposing pairs of deflector electrodes formed thereon. In a further aspect, the cavity bottom wall and the waveguide bottom wall also have opposing deflector electrodes formed thereon. The spacing between the cavity bottom and the bottom of the suspended portion of the waveguide is preferably in the range of about 0.1 to about 30 microns.

In a further aspect, the dynamic polarization controller of the present invention comprises a plurality of dynamic polarization controllers formed in a series along a single waveguide on the substrate.

In another aspect the present invention comprises a polarization mode dispersion compensation system using the dynamic polarization controller described above.

A more specific embodiment of a dynamic polarization controller of the present invention comprises a silicon substrate, a polymeric optical waveguide formed on the silicon substrate, an intermediate portion of the polymeric optical waveguide being suspended over a cavity formed in the silicon substrate and in one or more layers on the silicon substrate adjacent to the waveguide, at least two deflector electrodes formed on walls of the suspended portion of the polymeric optical waveguide and corresponding opposing electrodes formed on walls of the cavity thereby forming a plurality of opposing electrode pairs, and a control system for controllably applying a voltage difference to one or more of the opposing electrode pairs that a desired deflecting force may be applied to the suspended portion of the polymeric optical waveguide to alter its polarization properties. One or more layers on the silicon substrate adjacent to the waveguide may be polymeric.

In another aspect, the present invention is directed to a method of making a dynamic polarization controller, comprising forming an optical waveguide on a substrate, forming a cavity in the substrate surrounding an intermediate portion of the waveguide, such that the intermediate waveguide portion is suspended over the cavity, and forming a deflection structure for applying force to the suspended portion of the waveguide. Preferably, the substrate is a silicon wafer and the optical waveguide comprises a polymeric core material. The cavity may be formed by a two-step etching process comprising, first etching a region of the substrate to create a porous region in the substrate prior to the step of forming the waveguide, and then etching away the porous material formed during the first etch step after the waveguide has been formed. The first etch step may comprise electrochemical etching and the second etch step may comprise wet chemical etching. In order to avoid appreciable etching of the silicon substrate, the second etch step is preferably performed in less than ten seconds. The step of forming a cavity may comprise creating a mask layer over the substrate.

In yet another aspect the present invention is directed to a compensation system for controlling polarization mode dispersion of an optical signal transmitted in an optical system, comprising an optical input for receiving an optical signal from an optical fiber, a waveguide formed on a substrate for transmitting the optical signal through the compensation system, an intermediate portion of the waveguide being suspended in a cavity formed on the substrate, a deflecting structure for controllably applying a force to the suspended portion of the waveguide and thereby adjust the polarization properties of the optical signal passing through the suspended portion of the waveguide, a differential group delay compensator which receives the optical signal after it has passed through the suspended portion of the waveguide, a polarization monitoring device for monitoring the degree of polarization of the optical signal, and a controller coupled to the polarization monitoring device and coupled to the deflecting structure for adjusting the force applied by the deflecting structure in response to information received from the polarization monitoring device. Preferably, the waveguide is formed of one or more optical polymers, the substrate is silicon, and the bottom of the cavity is formed in the silicon substrate, and at least a portion of the sides of the cavity adjacent to the suspended portion of the waveguide are formed of polymers. The deflecting structure may comprise at least two pairs of opposing electrodes, wherein one electrode in each electrode pair is formed on a sidewall of the suspended portion of the waveguide, and the other electrode in the electrode pair is formed on an adjacent sidewall of the cavity; and wherein the controller is capable of adjusting the magnitude of voltage applied to each of the electrodes such that a controllable electrostatic force is applied by each electrode pair. Preferably, the differential group delay compensator is adjustable under the control of the controller and the polarization monitoring device is a degree of polarization monitor.

In still another aspect, the present invention is directed to a compensation system for controlling polarization mode dispersion of a plurality of optical signals transmitted in an optical fiber in a wavelength division multiplexing system, comprising an input for receiving the plurality of optical signals from the optical fiber, a demultiplexer for separating the plurality of optical signals into a corresponding plurality of individual channels, at least one array of dynamic polarization controllers formed on a single substrate, each of the dynamic polarization controllers associated with one of the individual channels and comprising a suspended waveguide form in a cavity in the substrate; a differential group delay compensator coupled to each of the dynamic polarization controllers to receive the optical signal from the dynamic polarization controller, a control system coupled to each of the dynamic polarization controllers for adjusting the polarization properties of the optical signal passing through the dynamic polarization controller, a monitoring system coupled to the controller for monitoring polarization of the optical signals in each of the channels, and a multiplexer for recombining the optical signals in the plurality of channels.

BRIEF DESCRIPTION OF THE DRAWINGS

The foregoing aspects and the attendant advantages of the present invention will become more readily appreciated by reference to the following detailed description, when taken in conjunction with the accompanying drawings, wherein.

DETAILED DESCRIPTION

The present invention is directed to a dynamic polarization controller and method of manufacturing the same, and to a system and method which are used to compensate for polarization mode dispersion ("PMD") of optical signals using the inventive dynamic polarization controller. The dynamic polarization controller of the present invention is relatively easy and inexpensive to fabricate using existing semiconductor processing technology and can be easily fabricated in arrays that are integrated with other optical components on a common substrate. The response time of the polarization controller of the present invention can be in the sub-millisecond range, such that it can respond to variations in PMD likely to be encountered in an optical network. In addition, a plurality of individual controllers can be easily arranged in a series to provide enhanced polarization control.

Figure 1:
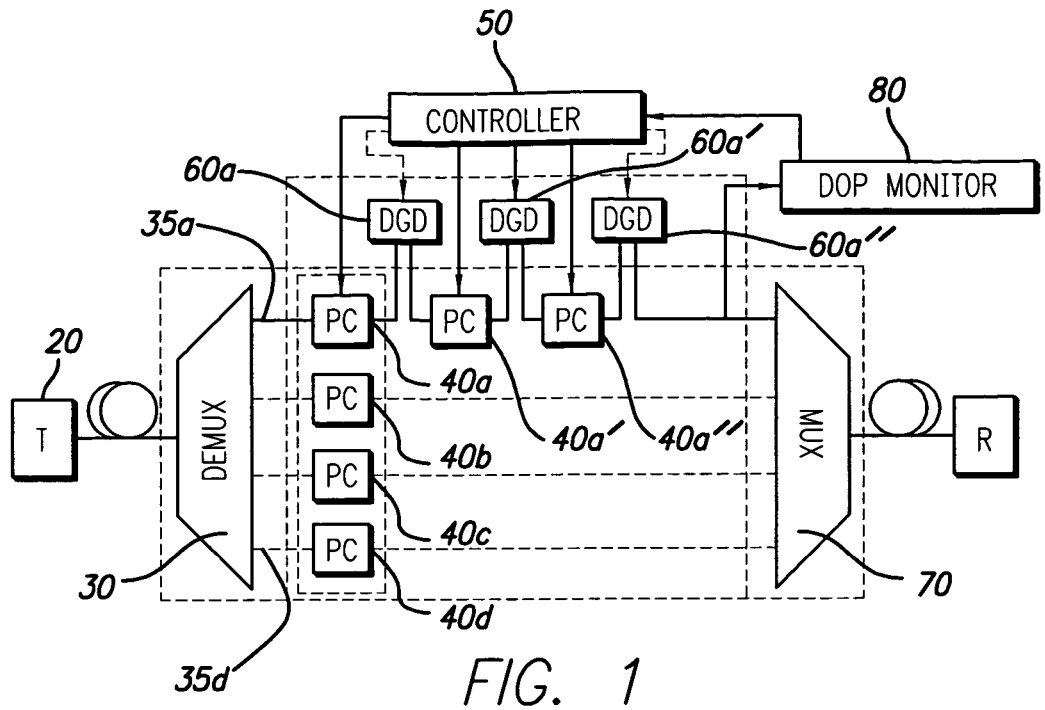
FIG. 1 is a schematic plan view of an embodiment of an apparatus for controlling polarization mode dispersion in an optical network in accordance with one aspect of the present invention.
Figure 2:
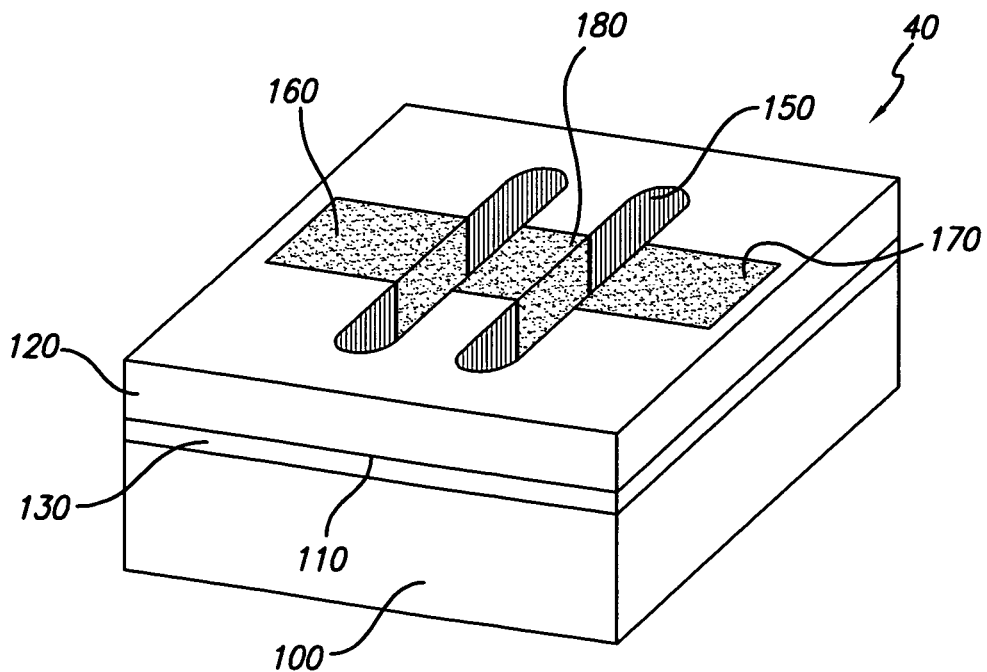
FIG. 2 is a perspective view of an embodiment of a dynamic polarization controller of the present invention.

FIG. 1 is a schematic plan view of an apparatus 10, in accordance with an embodiment of the present invention, which compensates for PMD in a WDM optical system. As noted, in a WDM system, multiple optical (i.e., light) signals, typically of slightly different wavelengths, are simultaneously transmitted in an optical fiber. The transmitted signals from source 20 are input into a demultiplexer where they are separated into a plurality of waveguide channels 35a-35d. While for illustrative purposes only four channels are shown, those skilled in the are will appreciate that WDM systems are capable of transmitting more than this, such that apparatus 10 may have a substantially greater number of channels. One structure which is convenient and compatible for demultiplexing the input optical signal is the arrayed waveguide grating ("AWG"). AWG structures are known and need not be described in further detail.

Waveguide channels 35a-35d are connected to a first set or array of dynamic polarization controllers 40a-40d. The construction and operation of the dynamic polarization controllers of the present invention are described in detail below. In summary, the polarization controllers are used in connection with differential group delay compensators and a control system to dynamically compensate for PMD caused by the transmission fiber. A controller 50 adjusts the degree of compensation provided by the various polarization controllers. A plurality of dynamic polarization controllers may be positioned serially in a channel to increase the amount of polarization control. To simplify the illustration, a plurality of three such polarization controllers 40a, 40a', 40a" in series is shown in one channel (channel "a"), and only the polarization controllers in channel a are shown to be connected to controller 50. However, in practice, each channel will typically have the same number of dynamic polarization controllers in series, and each of the polarization controllers will be connected to controller 50.

In addition to serial arrays of dynamic polarization controllers, PMD compensation apparatus 10 of the present invention has one or more differential group delay ("DGD") compensators 60 in each channel. FIG. 1 shows three such compensators 60a, 60a' and 60a" each of which receives the output optical signal form one of the polarization controllers in channel a. Thus, in the embodiment of FIG. 1, the output optical signals from the first and second DGD compensators 60a, 60a' are then input into the next polarization controller in series with it, and the output of the final DGD compensator 60a" is optically coupled to multiplexer 70. Multiplexer 70 then recombines the signals in each of optical channels a-d, and the combined signal is transmitted on.

DGD compensator 60 may fixed or variable (i.e., adjustable). Preferably, they are adjustable under the control of controller 50. In accordance with one embodiment of the present invention, compensation for PMD is attainable using one or more pairs of a dynamic polarization controller and a DGD compensator in each channel. Specifically, PMD is corrected by adjusting the principal states of polarization ("PSP") of an optical signal in connection with a DGD compensator. In accordance with an embodiment of the present invention, the polarization controller serves to adjust the PSP of the signal to match the PSP of the DGD compensator. As depicted, depending of the speed of the optical network and the length of the optical fibers, this may require several blocks in each channel, each block comprising a pairing of a dynamic polarization controller and a DGD compensator. Various types of adjustable DGD compensators are known in the art, and their construction and mode of operation need not be described in further detail. In an alternate embodiment, two or more dynamic polarization controllers of the present invention may be used in series to incrementally adjust the PSP of a signal prior to a single DGD compensator. Thus, there need not be a one to one correspondence between the number of DGD compensators and the number of dynamic polarization controllers.

After passing through the polarization controller/DGD compensator blocks, the polarization properties of the output signal may be monitored, for example, with a degree of polarization ("DOP") analyzer 80. Again, DOP analyzers, or other equivalent apparatus for monitoring polarization of an optical signal in real time, are known and need not be described in further detail. A small percentage of the light is diverted to the DOP analyzer to monitor its polarization properties. The output of DOP analyzer 80, or similar device, is then fed back to controller 50 thereby enabling the controller to dynamically adjust DGD compensators 60 (if they are adjustable) and polarization controllers 40, 40,' 40", as necessary, to counteract PMD. Those skilled in the art will appreciate that controller 50 may comprise a microprocessor-based system, with appropriate I/O devices, software, voltage supply, etc.

FIGS. 2-5 depict a dynamic polarization controller ("DPC") 40 in accordance with a preferred embodiment of the present invention. DPC 40 is fabricated on a silicon substrate 100 using known and widely used processing technologies. This makes the DPC of the present invention relatively easy and inexpensive to produce, reliable, reproducible, and readily combinable with other optical structures on a single substrate. A polymer waveguide core 110, sandwiched between upper and lower cladding layers 120, 130 is formed over the silicon substrate. Preferably, the upper and lower cladding layers are also polymers, each having a refractive index less than that of the waveguide core. Preferred optical polymers include epoxies, polyimides and siloxane-based resins. In a typical design, the core layer thickness is in the range of about 1 to about 10 microns, and more preferably in the range of about 4 to about 8 microns, and the upper and lower cladding layer thicknesses will be in the range of about 5 to about 50 microns, more preferably in the range of about 10 to about 20 microns. Optical polymers are available from a variety of manufacturers who make available detailed specifications concerning their properties and use.

In connection with the apparatus of FIG. 1, a plurality of such waveguides will be formed, there being at least one waveguide for each channel. Each waveguide is confined to a small portion of the substrate, however, the various polymer layers may be formed over the entire substrate, as depicted in the figures. A recess or cavity 150 is formed around waveguide 35, such that an intermediate portion of waveguide 35 is suspended in cavity 150. The remaining portions of waveguide 35, i.e., the portions that are not suspended within cavity 150, remain firmly attached to substrate 100.

A deflecting structure is used to exert a force on the suspended portion of the waveguide. In a preferred embodiment, electrode 180 is formed on the upper and side surfaces of the suspended portion of waveguide 35, and electrodes 160 and 170 are formed on the adjacent walls of cavity 150, such that pairs of electrodes face each other. In the embodiment illustrated in FIG. 2, electrode 180 is common to both sets of electrode pairs. In one alternative embodiment, the electrodes formed on the side walls of suspended waveguide portion 110 may be separate, such that different voltages may be applied. In another alternative embodiment, shown in FIG. 6, an electrode 190 is also formed on the bottom surface of the suspended portion of waveguide 35, and an opposing electrode 195 is formed on the adjacent bottom wall of cavity 150.

In accordance with the present invention, the application of suitable voltages to the electrodes is used to cause deflection of the suspended portion of the waveguide by applying an electrostatic force to the suspended portion of the polymer waveguide. This deflection, which can be in a direction which is either parallel or perpendicular to the surface of the substrate, induces anisotropic stresses in the waveguide core, causing strong birefringence in the polymer. The use of polymers is preferred because they have greater elasticity and, therefore, are more easily deflected than other materials with comparable optical properties. By controlling the degree of deflection of the waveguide, one can control both the degree and direction of the birefringence and, thereby, the polarization properties of light passing through the suspended waveguide. Specifically, the birefringence creates a phase shift between the modes with orthogonal polarizations resulting in the rotation of the polarization state relative to the input polarization state. In other words, there is a rotation of the PSP. For polymers with high elasto-optic coefficients, a micron scale deflection of the waveguide can induce strong birefringence, without compromising the structural integrity of the suspended portion of the waveguide. In addition, the small deflection required to induce birefringence keeps light leakage due to bending negligibly low.

Figure 3:
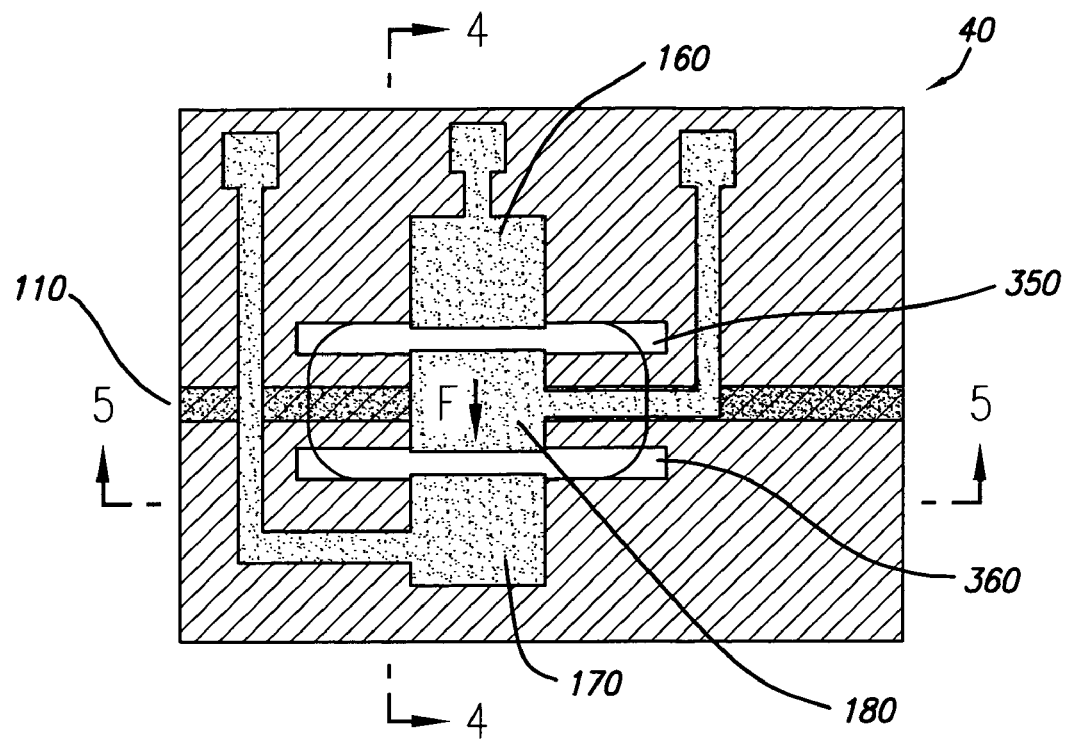
FIG. 3 is a simplified plan view of an embodiment of a dynamic polarization controller of the present invention.
Figure 4:
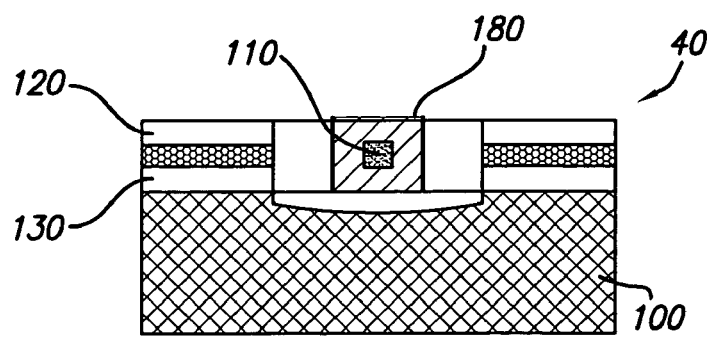
FIG. 4 is a cross-sectional view of the dynamic polarization controller of FIG. 3 along view lines A-A.
Figure 5:
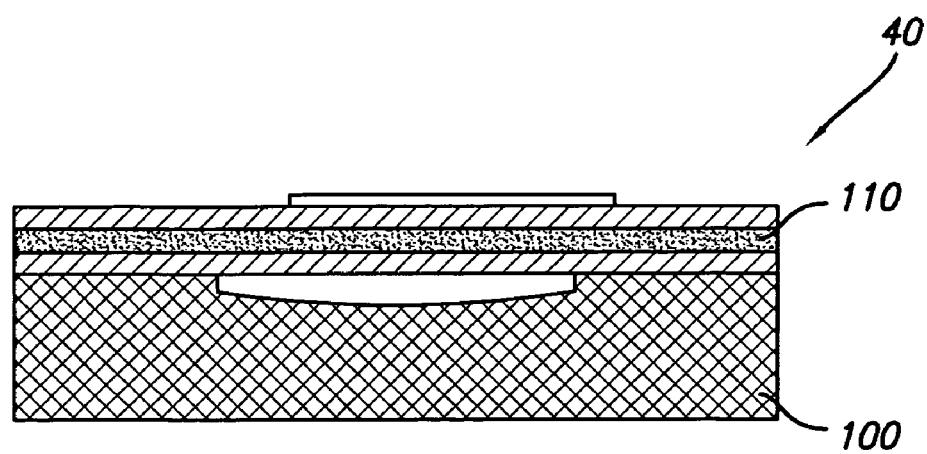
FIG. 5 is a cross-sectional view of the dynamic polarization controller of FIG. 3 along view lines B-B.

As an example, FIG. 3 shows positive voltages applied to electrodes 160 and 180, with a negative voltage being applied to electrode 170. Thus, electrode 160 repels electrode 180, the waveguide and electrode 170 attracts it, thereby creating an electrostatic force which deflects the waveguide towards the electrode 170. The magnitude of this electrostatic force is a function of the voltages applied to the electrodes, the size of the electrodes and the distance by which they are separated.

Figure 6:
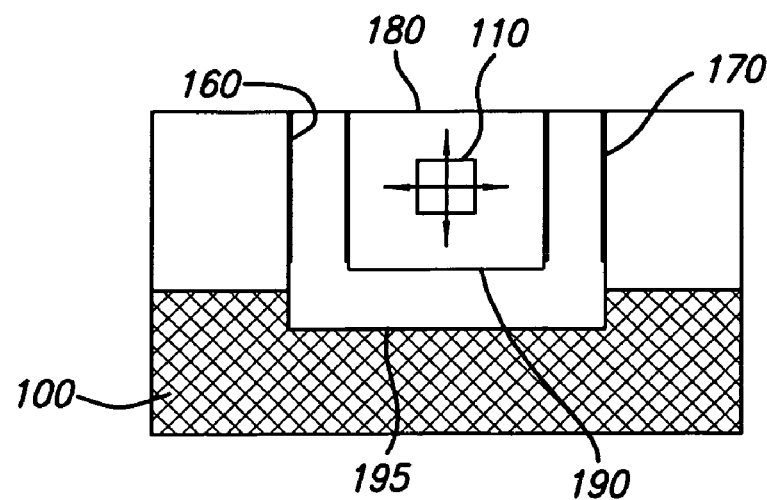
FIG. 6 is a cross-sectional view of another variation of the dynamic polarization controller of the present invention.

In the embodiment of FIGS. 2-5, deflection of the suspended waveguide is only possible in the horizontal direction. By forming electrodes on the lower surface of the suspended portion of the waveguide and on the opposing surface at the bottom of cavity 150, as depicted in FIG. 6, the suspended waveguide can also be deflected in a vertical direction. However, this makes fabrication more complex. To fabricate the device shown in FIG. 6, an intermediate layer with a sacrificial portion is preferably used instead of porous silicon. This intermediate layer, which may be referred to as a sacrificial layer, may be a photoresist that is patterned. The bottom electrode and connecting leads are first formed on the substrate, prior to forming the layer with the sacrificial portion. After the sacrificial layer is formed, an electrode is formed that will become the bottom electrode on the waveguide. The waveguide is then formed and a portion of the sacrificial layer is removed, leaving the upper and lower electrodes in position For example, if the sacrificial layer is a pattered photoresist, a resist stripper may be used in a conventional manner.

Figure 7:
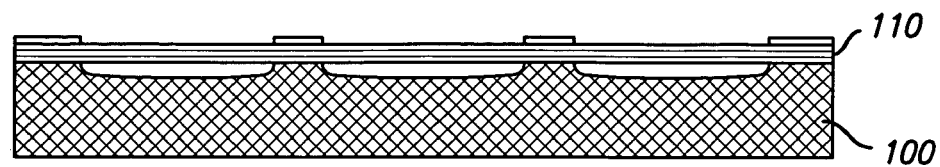
FIG. 7 is a cross-sectional view of another variation of the dynamic polarization controller of the present invention.

One DPC of the present invention may not be enough to completely control the output polarization. However, by sequentially cascading a number of DPC's formed in this manner, as shown for example in FIG. 7, it is possible to have complete control over the output state of polarization. Because of the very low mass of the suspended waveguides of the present invention, deflection can be induced in sub-millisecond time frames, which is sufficient for PMD compensation.

Figure 8A:
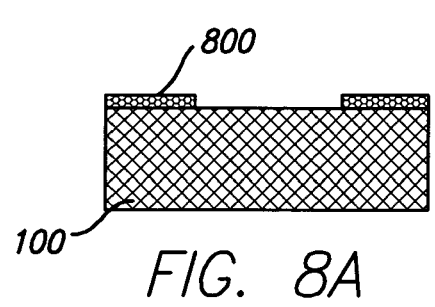
FIGS. 8A-8D depict cross-sectional views of a dynamic polarization controller of the present invention at various stages of fabrication.

FIGS. 8A-8D depict cross-sectional views of a dynamic polarization controller of the present invention at various stages of processing, according to one fabrication technique. The cross section is in a direction that is parallel to the waveguides. As noted, a significant advantage of the DPC of the present invention is that it may be fabricated using well-know processing technologies that are commonly used in the industry. FIG. 8A shows a silicon substrate 100 having a patterned mask layer 800 formed thereon. Mask layer 800 may be either a soft or hard mask layer. The creation of patterned mask layers using one or more photoresist layers and photolithography is well known in the art and need not be described in detail. For simplicity and convenience only one opening in mask layer 810 is shown, but those skilled in the art will appreciate that, in a practical embodiment, many such openings will be formed in the mask layer.

Figure 8B:
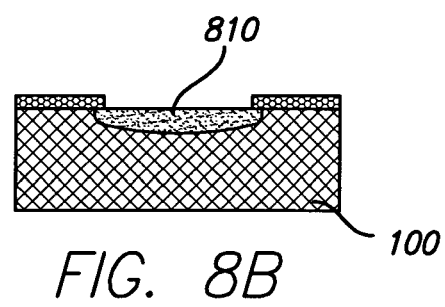

FIG. 8B shows a porous silicon area 810 formed in silicon substrate 100 below the opening in mask 800. Porous silicon can be created using simple electrochemical etching. During this process, very small micro- or nano-scale pores are formed in silicon. The porous silicon consists of nano-crystallites connected with small bridges surrounded by interconnected voids. Depending on the electrochemical etch process parameters, between 10% to 90% of the original silicon is removed. This allows the remaining silicon to be mechanically robust while retaining a flat surface. The depth of porous silicon area 810 can be as shallow as about 0.1 μm, or as deep as several tens of μm, for example, about 30 microns. The lateral dimensions of the porous silicon (i.e., the dimensions in the plane of the substrate) will vary according to the design considerations. Suitable electrochemical etchants include aqueous or ethanoic solutions of hydrofluoric acid (HF), with the HF concentration typically in the range of about 10% to about 35%.

Figure 8C:
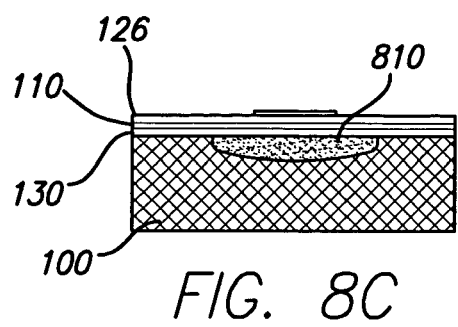

In FIG. 8C, mask layer 800 has been removed, using any standard stripping technique which does not alter the underlying porous silicon, and the waveguide structures have been formed, comprising a lower cladding layer 130, a core layer 110 and an upper cladding layer 120. Preferably these layers are all formed of optical polymers, with at least the core polymer layer having birefringence what is strongly related to stress (i.e., a high elasto-optic coefficient). The formation of a waveguide that extends above porous silicon area 810 involves well known deposition and patterning technologies. For example, the polymer layers can be deposited by spin or spray coating, and then patterned using standard photolithographic techniques to form discrete waveguide structures. Trenches 350, 360 (see FIG. 3), which will later form part of cavity 150, are then etched or otherwise formed in the polymer layers about the lateral sides of the waveguide. Electrodes 160, 170 and 180 are then formed over the waveguide, on adjacent portions of the upper cladding layer, and on the walls of trenches 350, 360. These are formed of a suitably conductive material, such as gold, using well known deposition and patterning techniques. At the same time the electrodes are formed, conductive leads and connecting pads associated with the electrodes are also formed.

Figure 8D:
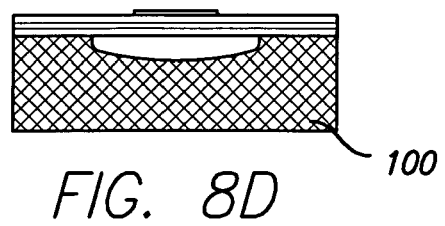

FIG. 8D shows the resulting, final structure after the sacrificial porous silicon has been removed. Removal of the porous silicon may be accomplished very quickly, i.e., in a matter of a few seconds (e.g., less than about ten seconds), using a suitable wet etching process, without causing any appreciable etching of the solid silicon. The structure of the porous silicon, with its nano-particles and interconnected voids, presents an extremely large surface area that is etched away very quickly. The removal of the porous silicon, in conjunction with trenches 350, 360 leaves a portion of the waveguide suspended in cavity 150. Optionally, one or more additional layers, such as a protective layer, may then be applied to the structure, or a portion thereof. Any suitable silicon etchant may be used, for example, concentrated potassium hydroxide (KOH).

Various parameters will influence the performance of the DPC of the present invention including: (1) The dimensions of the cavity, particularly the length of the suspended portion of the waveguide. (2) The spacing and size of the electrodes, and the magnitude of the maximum voltage that can be applied to the electrodes. (3) The internal dimensions of the waveguide. (3) The properties of the materials used in the waveguide, and any coating layers, including flexibility of all of the materials, the magnitude of stress induced birefringence in the waveguide core, and the difference in refractivity between the core and cladding layers as it affects light leakage. (4) The number of cascaded DPC's in series. Each of these factors will influence the precise device design.

The present invention offers many advantages. It is believed that polymeric waveguides fabricated on silicon provide the lowest cost technology for optical devices of this type. There are a number of highly stable optical polymers with low loss (e.g., less than 0.1 dB/cm), an index of refraction close to that of standard silica, and low polarization dependent loss ("PDL"), that are available for use in the present invention. The ability to construct arrays of the DPC's of the present invention on a single substrate allows easy combination and integration of such arrays with other planar optical devices, especially WDM devices. For example, a single WMD PMD compensator for 40 channels containing two DGD stages would require at least 80 DPC's of the present invention. All of these could be fabricated on a single silicon wafer using currently available processing technology. This eliminates errors introduced by misalignments and poor repeatability when working with a large number of non-integrated devices.

The dynamic polarization controller of the present invention has been described primarily in the context of a system for controlling polarization mode dispersion. Those skilled in the art will appreciate that there are many other uses for such controllers. Thus, for example, the DPC may also be used in connection with polarization scrambling, polarization dependent loss ("PDL") reduction and PMD or PDL measurement systems. Thus, the DPC can be used in connection with many types of polarization sensitive devices.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting the claims.

What is claimed is:

1. A dynamic polarization controller, comprising:
   a substrate having a cavity formed therein,
   an optical waveguide formed on and integral with said substrate, said optical waveguide having an intermediate portion thereof suspended in said cavity, said intermediate portion being continuous across said entire cavity, said cavity comprising sidewalls and a bottom wall, said intermediate portion of said waveguide positioned adjacent to said sidewalls such that no portion of said intermediate portion is positioned above said sidewalls outside of said cavity,
   a deflecting structure for controllably exerting a force on the suspended portion of said waveguide, such that the polarization properties of said waveguide can be controllably varied by said deflecting structure, said deflecting structure comprising deflector electrodes positioned on said sidewall and bottom wall of said waveguide and positioned on the surfaces of said waveguide opposing said sidewalls and bottom wall such that said deflecting structure is configured to deflect said intermediate portion of said waveguide towards or away from the sidewalls or the bottom wall of said cavity.

2. The dynamic polarization controller of claim 1 wherein said substrate is silicon.

3. The dynamic polarization controller of claim 1 wherein said waveguide is formed from optical polymers.

4. The dynamic polarization controller of claim 1 wherein the spacing between the cavity bottom and the bottom of the suspended portion of said waveguide is in the range of about 0.1 to about 30 microns.

5. A system for dynamic polarization control comprising a plurality of dynamic polarization controllers of claim 1 formed in a series along a single waveguide on said substrate.

6. A polarization mode dispersion compensation system comprising the dynamic polarization controller of claim 1.

7. A dynamic polarization controller, comprising:
   a silicon substrate having a cavity formed therein,
   a polymeric optical waveguide formed on and integral with said silicon substrate, an intermediate portion of said polymeric optical waveguide being suspended in said cavity and in one or more layers on said silicon substrate adjacent to said waveguide, said intermediate portion being continuous across said entire cavity, said cavity comprising sidewalls and a bottom wall, said intermediate portion of said waveguide positioned adjacent to said sidewalls such that no portion of said intermediate portion is positioned above said sidewalls outside of said cavity,
   a plurality of deflector electrodes positioned on said sidewall and bottom wall of said waveguide and positioned on the surfaces of said waveguide opposing said sidewalls and bottom wall such that said deflecting structure is configured to deflect said intermediate portion of said waveguide towards or away from the sidewalls or the bottom wall of said cavity, and
   a control system for controllably applying a voltage difference to one or more of said electrodes such that a desired deflecting force may be applied to said intermediate portion of said polymeric optical waveguide to alter the polarization properties of said intermediate portion of said polymeric optical waveguide.

8. The dynamic polarization controller of claim 7, wherein said one or more layers on said silicon substrate adjacent to said waveguide are polymeric.

9. A method of making a dynamic polarization controller, comprising:
   forming an optical waveguide on and integral with a substrate,
   forming a cavity in said substrate such that an intermediate waveguide portion is suspended in said cavity, said intermediate portion being continuous across said entire cavity, said cavity comprising sidewalls and a bottom wall, said intermediate portion of said waveguide positioned adjacent to said sidewalls such that no portion of said intermediate portion is positioned above said sidewalls outside of said cavity, and
   forming a deflection structure for applying force to said intermediate portion of said waveguide, said deflecting structure comprising deflector electrodes positioned on said sidewall and bottom wall of said waveguide and positioned on the surfaces of said waveguide opposing said sidewalls and bottom wall such that said deflecting structure is configured to deflect said intermediate portion of said waveguide towards or away from the sidewalls or the bottom wall of said cavity.

10. The method of claim 9 wherein said substrate is a silicon wafer.

11. The method of claim 9 wherein said optical waveguide comprises a polymeric core material.

12. The method of claim 9 wherein said cavity is formed by a two step etching process comprising, first etching a region of said substrate to create a porous region in said substrate prior to the step of forming said waveguide, and then etching away the porous material formed during said first etch step after said waveguide has been formed.

13. The method of claim 12 wherein said first etch step comprises electrochemical etching.

14. The method of claim 13 wherein said second etch step comprises chemical etching.

15. The method of claim 12 wherein said second etch step is performed in less than ten seconds.

16. The method of claim 9 wherein the step of forming a cavity comprises creating a mask layer over said substrate.

17. A compensation system for controlling polarization mode dispersion of an optical signal transmitted in an optical system, comprising:
   an optical input for receiving an optical signal from an optical fiber,
   a waveguide formed on and integral with a substrate for transmitting said optical signal through said compensation system, an intermediate portion of said waveguide being suspended in a cavity formed in said substrate, said intermediate portion being continuous across said entire cavity, said cavity comprising sidewalls and a bottom wall, said intermediate portion of said waveguide positioned adjacent to said sidewalls such that no portion of said intermediate portion is positioned above said sidewalls outside of said cavity,
   a deflecting structure for controllably applying a force to the suspended portion of said waveguide and thereby adjusting the polarization properties of the optical signal passing through said suspended portion of said waveguide, said deflecting structure comprising deflector electrodes positioned on said sidewall and bottom wall of said waveguide and positioned on the surfaces of said waveguide opposing said sidewalls and bottom wall such that said deflecting structure is configured to deflect said intermediate portion of said waveguide towards or away from the sidewalls or the bottom wall of said cavity, a differential group delay compensator which receives the optical signal after it has passed through said suspended portion of said waveguide, a polarization monitoring device for monitoring the degree of polarization of said optical signal, and a controller coupled to said polarization monitoring device and coupled to said deflecting structure for adjusting the force applied by said deflecting structure in response to information received from said polarization monitoring device.

18. The PMD compensation system of claim 17, wherein said waveguide is formed of optical polymers.

19. The PMD compensation system of claim 18 wherein said substrate is silicon.

20. The PMD compensation system of claim 19 wherein said bottom wall of said cavity is formed in said silicon substrate, and wherein at least a portion of said sidewalls of said cavity adjacent said suspended portion of said waveguide are formed of polymers.

21. The PMD compensation system of claim 17, wherein said differential group delay compensator is adjustable under the control of said controller.

22. The PMD compensation system of claim 17 wherein said polarization monitoring device is a degree of polarization monitor.

* * * * *